Figure 1:
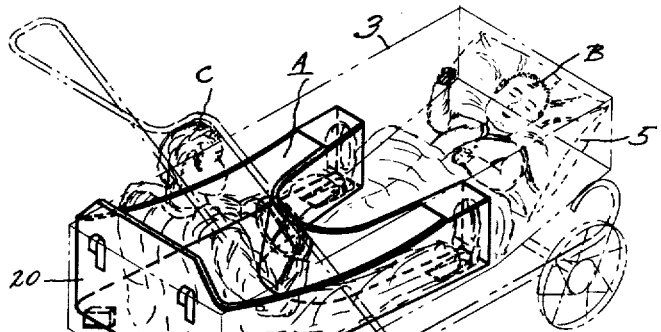

Dec. 1, 1964   M. P. G. THERIAULT   3,159,424
REMOVABLE CHAIR FOR BABY CARRIAGE
Filed Nov. 14, 1962   2 Sheets-Sheet 1

INVENTOR
MARIE PIERRETTE GAETANE THERIAULT
Kenyon, Palmer, Stewart & Estabrook
ATTORNEYS United States Patent Office 3,159,424
Patented Dec. 1, 1964

3,159,424
REMOVABLE CHAIR FOR BABY CARRIAGE
Marie Pierrette Gaetane Theriault, 2320 Tupper Ave.,
Ottawa, Ontario, Canada
Filed Nov. 14, 1962, Ser. No. 237,466
5 Claims. (Cl. 297—217)

This invention relates to a removable chair for a baby carriage, particularly a chair that may be removed from or inserted into a baby carriage without interfering with the baby's comfort.

At present, it is usual to see baby carriages or sleighs having a baby lying down horizontally and an older child sitting at one end of the carriage with his feet lying on both sides of the baby. It is usual for the mother or other person, who is taking the baby and child for an outing, to let the older child walk beside the carriage until the child becomes tired. Then the child is lifted into the carriage and made to sit with his legs around or over the baby. It is impossible to prevent the dirt, mud or wet snow which is on the child's feet or clothes from soiling the covers of the baby.

It is known at present to provide seats in an automobile for small children, that are suspended from the back of the seats so that the children are safe and able to watch the scenery through the windows. Also, it is known to suspend cots or hammocks from the window sills or hooks inside automobiles to permit babies or small children to rest. It is also known to suspend wire baskets from bicycles, carriages or the like for holding parcels or other material.

The main object of this invention is to provide a removable chair for a baby carriage, which is reliable of operation, simple to operate, and constructed of quality materials and durable.

Another object is to provide a removable chair for a baby carriage that provides safety, comfort and convenience for baby and child.

Another object is to provide a removable chair for a baby carriage that prevents the child, when seated in the chair, from disturbing the baby.

Another object is to provide a removable chair for a baby carriage that prevents the child, when seated, from falling out of the carriage.

Another object is to provide a removable chair for a baby carriage that prevents dirt, mud and water on the child's feet or clothes from soiling the coverings of the baby.

The above objects are accomplished by providing a removable chair for the baby carriage or sleigh shaped to fit the rear part of the carriage and provided with hooks for fitting over the back of the carriage to retain the chair in proper and secure position; the chair is U-shaped in horizontal plan and surrounded by vertical walls of desired height and shape; two parts of the U-shaped chair extend forwardly of the carriage for receiving the child's feet; the two forwardly-extending parts are spread apart sufficiently to permit the baby's legs or feet to rest comfortably between them, and the forward end of these two extending parts may be provided with covers for the child's feet or may be open and be provided with straps or other fastening devices for retaining the child's feet in proper position; depressions are preferably provided in the base of the forward end of the two extending parts for collecting the water from the child's feet; the seat is tilted forwardly by providing supports of the desired height under the rear end of the base of the chair, so as to ensure that the water flows into the depressions; a curved support is attached to the inner side of the vertical wall of the chair to fit the child's back with proper comfort.

Figure 2:
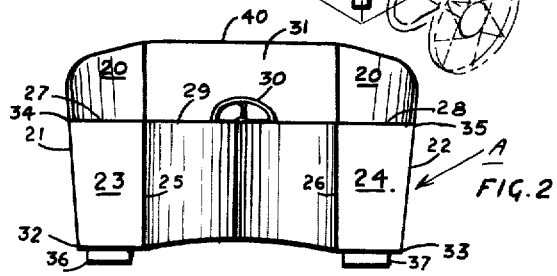
Figure 3:
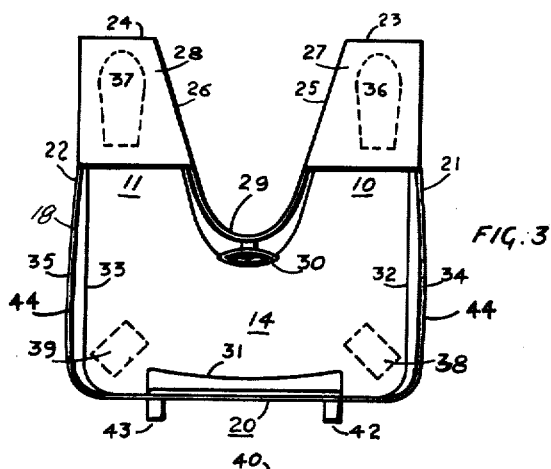
Figure 5:
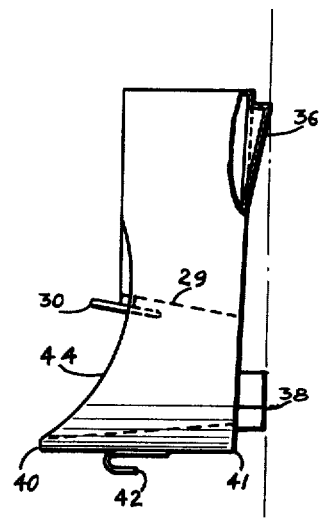
Figure 4:
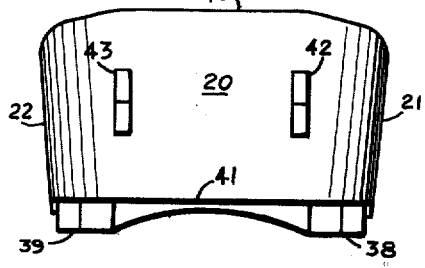
Figure 6:
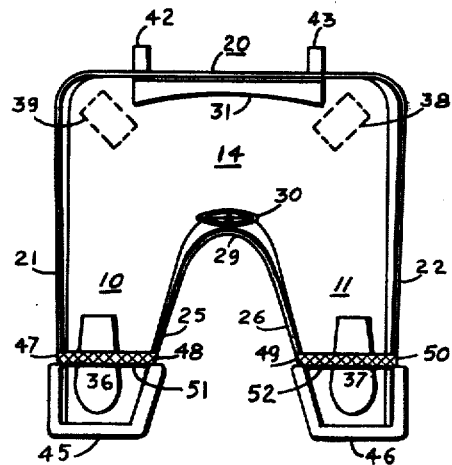
Figure 7:
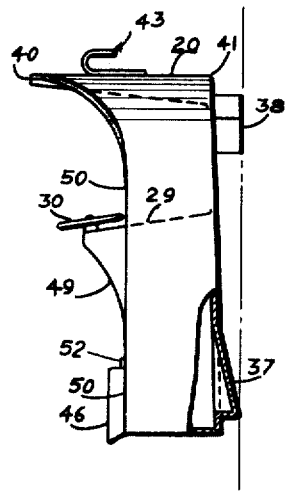
Figure 8:
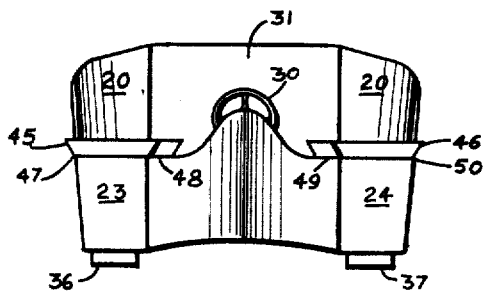

The invention consists in the novel arrangements, construction and combination of parts hereinafter described and shown in the drawings, wherein:

FIGURE 1 shows a more or less diagrammatic plan view of the conventional baby carriage, with removable chair, all in accordance with this invention;
FIGURE 2 is a front end view of the removable chair;
FIGURE 3 is a plan view of the removable chair;
FIGURE 4 is a rear end view of the removable chair;
FIGURE 5 is a side view of the removable chair;
FIGURE 6 is a plan view of a modification of the removable chair;
FIGURE 7 is a side view of FIGURE 6, and
FIGURE 8 is a front end view of FIGURE 6.

Referring now to the drawings, particularly to FIGURE 1, a baby B and a child C are shown (in dotted outline) in the carriage body 3. The baby lies on his back, with his head resting on the usual adjustable head support 5 of the carriage body. The legs of the baby extend toward the rear of the carriage.

A removable chair, shown in its entirety as A, is removably placed at the foot of the carriage body. In this chair sits the child, sitting bolt upright with his feet toward the head of the carriage.

The chair, as best shown in plan in FIGURE 3, is formed with a seat proper 14 and two spaced, forwardly-extending leg portions or parts 10 and 11. In the U space defined between the two legs are received the legs of the baby.

A substantially vertical wall 18 extends completely around and is united at its base to the U-shaped seat 14, and consists of a back portion 20, outer sides 21 and 22, front ends 23 and 24, and inner sides 25 and 26.

As shown in FIGURES 2 and 3 the tops of the forwardly-extending parts 10 and 11 are shown with integral covers 27 and 28. The vertical inner sides 25 and 26 of the chair 9 come together in a rearwardly extending curve 29. Around the curve 29 the vertical wall member slopes forwardly. A toy steering wheel 30 is shown removably attached for the child's amusement. The vertical back portion 20 of the chair is provided with a shaped back support 31 for the comfort of the child, as the straight vertical back portion 20 would be very uncomfortable after a while.

Referring to FIGURES 2 to 5, inclusive, which show the removable chair in more details, it will be seen that the sides 21 and 22 slope slightly outwardly from the lower edges 32 and 33 to the upper edges 34 and 35. The forward slope of the curved part 29 is clearly shown in FIGURE 5. Foot shaped drains 36 and 37 are provided in the base of the forwardly extending parts 10 and 11 as shown in FIGURES 3 and 5 for collecting water from the child's feet, and slope downwardly toward the front. Pedestals 38 and 39 are fastened to the rear underside of the seat 14 to elevate the rear of the seat of the chair A above the base of the carriage body 3 higher than the front end of the chair seat, and thus cause any moisture to flow forwardly along the parts 10 and 11 into the drains 36 and 37.

The curved back support 31 extends from the upper edge 40 to the lower edge 41 of the back portion 26 of the chair A. Hooks 42 and 43 are mounted on the rear upper part of the back portion 20 for securing the chair A over the top edge of the rear side of the carriage body 3. The top edges of the sides 21 and 22 are concave shaped as shown in FIGURE 5 at 44.

FIGURES 6, 7 and 8 show a modification of the forwardly extending parts 10 and 11, in which the parts 10 and 11 are open at the top. Outwardly and upwardly extending flanges 45, 48, 49 and 50 of the outer sides 21 and 22, front ends 23 and 24, and inner sides 25 and 26. Straps 51 and 52 are adjustably fastened to the upper edges 47, 48, 49 and 50 to retain the child's feet safely in the parts 10 and 11. The drains 36 and 37 are the same as in the previous modification. As shown in FIGURE 6, the top edges 47 and 50 are straight and the top edges 48 and 49 curve rearwardly and upwardly toward the curved portion 29.

The removable chair may be made of plastic or other suitable material that is light, durable, flexible and washable.

The operation of the removable chair should be clear from the above description. When a mother or other person decides to take a baby for an outing and also wishes to take anoher child with her, she merely places the chair in the baby carriage as above described, and whenever she decides, she places the child in the chair which prevents any moisture reaching the baby or other disturbances to the baby. If she is only taking the baby for the outing, then she removes the chair from the carriage.

While the invention has been shown and described with particular reference to specific embodiments, it is understood that it is not to be limited thereto but is to be construed broadly and limited only by the scope of the claims.

What is claimed is:

1. For use in a baby carriage including vertical side walls and a front wall, a chair for a second child adapted removably to be laid into the carriage adjacent the rear wall, comprising a bottom panel presenting in plan a portion forming a seat proper and two laterally-spaced leg portions adapted to extend from the seat proper in a direction toward the front wall of the carriage, walls rising from the edges of the seat proper and the leg portions and defining therewith a hollow body constituting the chair in which a second child may be seated, and means on the leg portions forming receptacles in which liquid dripping from the second child's shoes may collect.

2. A chair as set forth in claim 1, wherein the leg portions are at least in part provided with covers to form enclosures for the second child's feet.

3. A chair as in claim 1, wherein means are provided to retain the chair in a position such that the leg portions slant forwardly-downwardly.

4. A chair as in claim 1, including means for detachably securing the chair to the baby carriage.

5. A chair as in claim 1, including means for detachably securing the chair to the baby carriage.

References Cited in the file of this patent

UNITED STATES PATENTS

| | | |
|---|---|---|
| 460,031 | Rastetter et al. | Sept. 22, 1891 |
| 2,161,658 | Hansburg | June 6, 1939 |
| 2,532,004 | Zepp | Nov. 28, 1950 |
| 2,695,048 | Jenner | Nov. 23, 1954 |
| 2,969,830 | Thompson | Jan. 31, 1961 |
| 2,979,121 | Gates | Apr. 11, 1961 |
| 2,997,311 | Umanoff | Aug. 22, 1961 |
| 3,002,788 | Rogers | Oct. 3, 1961 |
| 3,016,266 | Caplan | Jan. 9, 1962 |

FOREIGN PATENTS

| | | |
|---|---|---|
| 620,512 | Canada | Dec. 3, 1958 |